United States Patent
Yan (10) Patent No.: US 9,769,124 B2
(45) Date of Patent: Sep. 19, 2017

(54) METHOD AND APPARATUS FOR PROVIDING ACCESS CONTROL TO SHARED DATA BASED ON TRUST LEVEL

(71) Applicant: Nokia Technologies Oy, Espoo (FI)

(72) Inventor: Zheng Yan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/425,989

(22) PCT Filed: Sep. 21, 2012

(86) PCT No.: PCT/CN2012/081761
§ 371 (c)(1),
(2) Date: Mar. 4, 2015

(87) PCT Pub. No.: WO2014/043894
PCT Pub. Date: Mar. 27, 2014

(65) Prior Publication Data
US 2015/0222606 A1    Aug. 6, 2015

(51) Int. Cl.
*G06F 21/62* (2013.01)
*H04L 29/06* (2006.01)
*H04L 9/08* (2006.01)

(52) U.S. Cl.
CPC .......... *H04L 63/0428* (2013.01); *G06F 21/62* (2013.01); *G06F 21/6218* (2013.01);
(Continued)

(58) Field of Classification Search
CPC . H04L 63/061; H04L 63/0428; H04L 9/0819; G06F 21/62
See application file for complete search history.

(56) References Cited

U.S. PATENT DOCUMENTS

2002/0124053 A1 * 9/2002 Adams .................... G06F 9/468
                                                        709/216
2007/0094260 A1 * 4/2007 Murphy .................. G06F 21/51
(Continued)

FOREIGN PATENT DOCUMENTS

CN    WO 2011116528 A1 *  9/2011   .......... H04L 63/104
WO        2007048251        5/2007
(Continued)

OTHER PUBLICATIONS

Bethencourt et al. Ciphertext-Policy Attribute-Based Encryption May 20-23, 2007 Security and Privacy, 2007. SP '07. IEEE Symposium pp. 321-334.*
(Continued)

*Primary Examiner* — David Pearson
(74) *Attorney, Agent, or Firm* — Mintz Levin Cohn Ferris Glovsky and Popeo, P.C.

(57) ABSTRACT

An approach is provided for providing access control to shared data based on a trust level. A method comprising, encrypting, at a first device, data with public attribute keys associated with attributes according to an attribute-based encryption (ABE) scheme, wherein the attributes comprising at least one trust level related attribute representing an access condition for the data based on a trust level; storing the encrypted data into a data center, determining the eligibility of a user of a second device by checking whether a trust level of the user of the second device satisfies the access condition; and issuing to the second device, secret attribute keys associated with attributes and personalized for the user of the second device for decrypting the encrypted data, when the user of the second device is eligible.

23 Claims, 5 Drawing Sheets

(52) U.S. Cl.
CPC ........ *H04L 9/0847* (2013.01); *H04L 63/0442* (2013.01); *H04L 63/061* (2013.01); *H04L 63/102* (2013.01); *H04L 9/0819* (2013.01); *H04L 63/108* (2013.01)

(56) References Cited

U.S. PATENT DOCUMENTS

| | | | |
|---|---|---|---|
| 2008/0189768 A1* | 8/2008 | Callahan | H04L 63/105 726/4 |
| 2008/0263357 A1* | 10/2008 | Boyen | H04L 9/083 713/168 |
| 2009/0151002 A1* | 6/2009 | Zuniga | G06F 21/6209 726/27 |
| 2010/0246827 A1* | 9/2010 | Lauter | G06F 21/6209 380/278 |
| 2011/0145593 A1* | 6/2011 | Auradkar | G06F 21/6218 713/189 |
| 2011/0153746 A1* | 6/2011 | Callanan | G06F 17/30165 709/205 |
| 2012/0144210 A1 | 6/2012 | Yacobi | |
| 2012/0314854 A1* | 12/2012 | Waters | H04L 9/3073 380/28 |
| 2013/0091214 A1* | 4/2013 | Kellerman | G06Q 30/00 709/204 |
| 2013/0227700 A1* | 8/2013 | Dhillon | G06Q 50/01 726/26 |
| 2015/0013018 A1 | 1/2015 | Yan | |
| 2015/0046696 A1 | 2/2015 | Zheng | |
| 2015/0256517 A1 | 9/2015 | Yan | |

FOREIGN PATENT DOCUMENTS

| | | |
|---|---|---|
| WO | 2011073894 | 6/2011 |
| WO | WO-2011/116528 A1 | 9/2011 |
| WO | 2012037056 | 3/2012 |

OTHER PUBLICATIONS

Baden et al. Persona: An Online Social Network with User-Defined Privacy SIGCOMM'09 Aug. 17-21, 2009.*
International Search Report and Written Opinion received for corresponding Patent Cooperation Treaty Application No. PCT/CN2012/081761, dated Jun. 27, 2013, 10 pages.
Muller et al., "Distributed Attribute-Based Encryption," Information Security and Cryptology, pp. 20-36 (2008).

* cited by examiner

METHOD AND APPARATUS FOR PROVIDING ACCESS CONTROL TO SHARED DATA BASED ON TRUST LEVEL

RELATED APPLICATION

This application was originally filed as PCT Application No. PCT/CN2012/081761 filed Sep. 21, 2012.

FIELD OF THE INVENTION

The present invention generally relates to communications. More specifically, the invention relates to securely and efficiently providing access control to shared data based on a trust level, which can be generated, for example, based on social networking activities, behaviors and experiences.

BACKGROUND

Communication service providers (e.g., wireless, cellular, internet, etc.) and device manufacturers are continually challenged to deliver value and convenience to consumers by, for example, providing compelling network services, applications and contents. One area of interest has been the development of social networking services and other services for making connections and sharing data, contents or resources among users. One exemplary service is that various personal/private data (such as health records, exam results, work schedules, etc.) of a user could be saved in a data center, for example offered by a cloud computing service provider (CSP), to release the storage and maintenance burden of the user equipment. In an example scenario, a user's health records can be saved and maintained in a data center offered by a CSP for sharing among multiple other users. Obviously, the user would like to permit only appropriate users to access this personal data. For example, when a health treatment of the user in a hospital is needed, a doctor in this hospital can be granted a right to access the user's health records stored in the data center. However, after the user left the hospital, for example after the user was cured or transferred to another hospital, the user may want to revoke the granted access right of the doctor due to dissatisfaction (i.e., trust in him/her is decreased), and/or may want to permit another doctor in the another hospital to access his/her health records. In addition, the data center or the CSP may be semi-trusted. For example, the CSP may be curious to know or maliciously disclose the user's personal data.

SOME EXAMPLE EMBODIMENTS

In order to avoid the user's data being accessed by inappropriate users or being disclosed by a semi-trusted data center or service provider, the user can encrypt the data to control access. Access control on the encrypted data means that the encrypted data can only be decrypted by users with permissions. The ideal approach is to encrypt the data once, and distribute corresponding decryption keys to corresponding permitted users once, so that only the permitted users can decrypt the encrypted data with the corresponding decryption keys. However, in the social networking services, users permitted to access the data stored in a data center may change dynamically and frequently, for example, due to the change of contexts (such as leaving the hospital in the above example scenario), the change of social relationships among users, or just the change of the user's preference, etc. Accordingly, the encrypted data and decryption keys should be frequently changed in order to achieve expected security level. This frequent change increases much computing and communication loads onto the users and the service providers, and makes it much more difficult to control access to shared data to protect privacy and ensure that only appropriate users have appropriate access. Thus, service providers and device manufacturers face significant technical challenges to control access to shared data, for example over one or more the social networking services, securely and efficiently.

To overcome limitations in the prior art described above, and to overcome other limitations that will be apparent upon reading and understanding the present specification, the disclosure provides an approach for providing access to shared data based on a trust level, so as to ensure that the shared data can be accessed by trustworthy users securely and efficiently.

According to one embodiment, a method comprises encrypting, at a first device, data with public attribute keys associated with attributes according to an attribute-based encryption (ABE) scheme, wherein the attributes comprising at least one trust level related attribute representing an access condition for the data based on a trust level. The method further comprises storing the encrypted data into a data center. The method further comprises determining the eligibility of a user of a second device by checking whether a trust level of the user of the second device satisfies the access condition. The method further comprises issuing to the second device, secret attribute keys associated with attributes and personalized for the user of the second device for decrypting the encrypted data, when the user of the second device is eligible.

In an exemplary embodiment, the method can further comprise automatically evaluating the trust level of the user of the second device based on the mobile social networking activities between a user of the first device and the user of the second device.

In an exemplary embodiment, the trust level of the user of the second device can be re-evaluated after the secret attribute keys was issued to the user of the second device. Then, the method can further comprise re-determining the eligibility of the user of a second device by checking whether the re-evaluated trust level of the user of the second device still satisfies the access condition; and informing the data center that the user of the second device is ineligible, when the user of the second device is ineligible.

In an exemplary embodiment, the method can further comprise setting the access condition for the data. Alternatively or additionally, the method can further comprise informing to the second device an access policy of the data, which indicates a corresponding access condition used for a particular access context. Then, the secret attribute keys can be generated based on the identity of the user of the second device and the at least one trust level related attribute representing the corresponding access condition indicated by the access policy.

In an exemplary embodiment, the method can further comprise receiving at the first device, a request of the user of the second device directly from the second device or via the data center, to access the data. The determination of the eligibility of the user of the second device can be performed in response to the request.

In an exemplary embodiment, the method can further comprise sending a feedback regarding the performance of the data center to a third party; and determining whether or not to continue storing the encrypted data in the data center according to a reputation which is evaluated by the third party based on the feedback. The third party for reputation evaluation can be provided by a cloud service provider.

In an exemplary embodiment, the secret attribute key associated with the at least one trust level attribute can be generated based on an identity of the user of the second device and the at least one trust level related attribute. In an exemplary embodiment, the trust level related attribute can indicate a pre-determined threshold of trust level, and the checking comprises checking whether the trust level of the user of the second device meets the pre-determined threshold of trust level.

In an exemplary embodiment, the attributes can further comprise at least one time related attribute representing the access condition for the data based on a valid time period. Then, the determining of the eligibility can further comprise checking whether the user of the second device is eligible in the valid time period. The secret attribute key associated with the at least one time related attribute can be generated based on an identity of the user of the second device and the at least one time related attribute.

In an exemplary embodiment, the data center can be offered by a cloud computing service provider.

According to another embodiment, an apparatus comprising at least one processor, and at least one memory including computer program code, the at least one memory and the computer program code configured to, with the at least one processor, cause, at least in part, the apparatus to encrypt, at a first device, data with public attribute keys associated with attributes according to an attribute-based encryption (ABE) scheme. The attributes can comprise at least one trust level related attribute representing an access condition for the data based on a trust level. The apparatus is further caused to store the encrypted data into a data center. The apparatus is further caused to determine the eligibility of the user of a second device by checking whether a trust level of a user of a second device satisfies the access condition. The apparatus is further caused to issue to the second device, secret attribute keys associated with attributes and personalized for the user of the second device for decrypting the encrypted data, when the user of the second device is eligible.

According to another embodiment, a computer-readable storage medium carrying one or more sequences of one or more instructions which, when executed by one or more processors, cause, at least in part, an apparatus to encrypt, at a first device, data with public attribute keys associated with attributes according to an attribute-based encryption (ABE) scheme. The attributes can comprise at least one trust level related attribute representing an access condition for the data based on a trust level. The apparatus is further caused to store the encrypted data into a data center. The apparatus is further caused to determine the eligibility of a user of a second device by checking whether a trust level of the user of the second device satisfies the access condition. The apparatus is further caused to issue to the second device, secret attribute keys associated with attributes and personalized for the user of the second device for decrypting the encrypted data, when the user of the second device is eligible.

According to another embodiment, an apparatus comprises means for encrypting, at a first device, data with public attribute keys associated with attributes according to an attribute-based encryption (ABE) scheme, wherein the attributes comprising at least one trust level related attribute representing an access condition for the data based on a trust level. The apparatus also comprises means for storing the encrypted data into a data center. The apparatus also comprises means for determining the eligibility of a user of a second device by checking whether a trust level of the user of the second device satisfies the access condition. The apparatus also comprises means for issuing to the second device, secret attribute keys associated with attributes and personalized for the user of the second device for decrypting the encrypted data, when the user of the second device is eligible.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for controlling access to shared data based on a trust level are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in a block diagram form in order to avoid unnecessarily obscuring the embodiments of the invention.

Trust plays an important role in the social networking for making connections and sharing data, contents or resources among users. It helps people overcome perceptions of uncertainty and risk and engages in "trust-related behaviors". Herein, a trust level can be used as a measure to assess the level of belief and dependence that one entity (such as a user, a group, an organization, and the like) put into another entity. The trust level can be derived from direct or indirect knowledge/experience on earlier interactions of entities. In an exemplary embodiment, the trust level of a user can be evaluated based on the various social activities performed by the user in social networking services. For example, with the rapid growth of mobile communications and networking and the wide usage of mobile devices, people can use their mobile devices to perform various social activities and networking, such as making a remote call, accessing internet to talk to somebody, sending short messages, and conducting instant social activities (e.g., based on mobile ad hoc networks or via a local connectivity approach, such as WLAN, WiFi, Bluetooth, etc.). Trust relationships in different contexts can be assessed based on different mobile social networking activities, behaviors and experiences.

However, most existing work in industry didn't consider how to control data access based on a trust level. Several research groups have focused on social networking services based on mobile ad-hoc networks. For example, Stanford MobiSocial Group has developed Junction, which is a mobile ad hoc and multiparty platform for MANET (Mobile Ad-hoc Networks) applications, SyNRG in Duke University has developed Micro-blog, which helps users to post micro-blogs tagged by locations; ETHz Systems Group has introduced AdSocial, which provides a pervasive social communication platform. However, trust and reputation aspects in social networking services are not considered in these projects, let alone applying the trust level derived from social networking activities to control access to shared data, such as a cloud computing data access. Traditional centralized social networking systems (e.g., facebook) have not seriously taken user privacy and user data protection into concern. The group based access control is rough and easily to be attacked. They haven't yet linked to data sharing services (such as cloud computing services) for context-aware data access control.

Furthermore, in industry, quite a number of companies, such as Microsoft, Nokia and Intel have conducted researches in the area of pervasive social networking (PSN). For example, Microsoft Research Asia developed EZSetup system in order to make a mobile user find services provided by his/her neighbors. The Nokia Instant Community developed by the Nokia Research Center provides an instant social networking platform to allow people in vicinity to communicate, get to know, and share information and data with each other. Similarly, Intel Berkeley Lab run a project named Familiar Stranger based on mobile devices to extend our feelings and relationships with strangers that we regularly observe but do not interact with in public places. However, none of them pursue how to make use of the trust established in social networking for controlling access to shared data, such as data access in a cloud computing data center.

Although there are some techniques applied in trust assessment, there is no research performed regarding issues on how to make use of trust assessments for example based on the mobile social networking, for security assurance and privacy enhancement, e.g., secure access to private data. For example, Advogato (http://www.advogato.org/) is an online service to provide a platform for free software developers, to advocate software and promote research. One significant impact of Advogato is its trust metrics behind the service, which is the basis of many research projects (http://www.advogato.org/trust-metric.html). Advogato trust metric stimulates users to contribute quality-ensured software and protects against attacks. However, Advogato only applies a centralized architecture for reputation generation. It doesn't consider how to control data access based on trust and/or reputation level. Furthermore, it cannot provide reputation for a data center (e.g. of a CSP) which is in charge of storing and maintaining the shared data, to avoid the shared data being disclosed by the data center.

Most existing work didn't consider how to control data access based on the trust level. Generally, access control applies data encryption, so that the encrypted data can only be decrypted by users with permissions. The ideal approach is to encrypt each data once, and distribute appropriate keys to users once, so that each user can only decrypt his authorized data. Previous work seldom controlled data access based on the level of trust although trust is an crucial factor that should be considered in the process of authorizing data access. However, due to the dynamic characteristic of trust and the change of trust level in different context, the decryption key should be frequently changed in order to achieve an expected security level.

There is another difficulty faced by the access control regarding a user revocation. The user revocation means that the data owner withdraws access rights from users, for example, who no longer belong to a group or due to other reasons, e.g., the user is not trustworthy enough. Since the revoked users still retain the decryption keys issued earlier, and thus can still decrypt the encrypted data. As such, the data owner may need to encrypt its data with new keys, so that the revoked users cannot decrypt the recent data any more using their old keys, and redistribute the new keys to the remaining authorized users, so that they can still access. Obviously, the key re-generation and management will introduce an extra computing load and make the system complicated.

According to various exemplary embodiments, an efficient and secure access control can be provided based on a trust level by applying, for example, the Attribute-based encryption (ABE) scheme. The attribute-based encryption (ABE) is a newly developed cryptographic technique. According to the ABE scheme, users are identified by a set of attributes rather than an exact identity. Each data is encrypted with an attribute-based access condition constructing an access policy of the data, such that only users whose attributes satisfy the access condition can decrypt the data. For example, for data D, encrypted with the access condition A1 or A2, either users with attributes satisfying A1 or users with attributes satisfying A2, can decrypt D. Recently ABE is widely applied in secure data storage for cloud computing. But none of existing work proposes controlling the access of data stored at the CPS based on the trust level. None of existing work proposes controlling the access of data stored at the CPS based on the trust level generated based on social networking activities, behaviors and experiences.

In exemplary embodiments, for providing an efficient and secure access to shared data, a data owner can encrypt his/her data by encrypting his data with a public attribute key associated with an attribute related to a trust level according to an ABE scheme. The trust level related attribute representing an access condition for his data based on the trust level. For example, the trust level related attribute is a threshold of trust level, to indicate that only those users having a trust level greater than or equal to the threshold can access the data. Then, the data owner can store the encrypted data into a data center to share the data with other users. The data owner can issue corresponding personalized decryption keys to the eligible users whose trust levels satisfy the access condition (e.g. meet the threshold of trust level), to enable them to decrypt the encrypted data.

Figure 1:
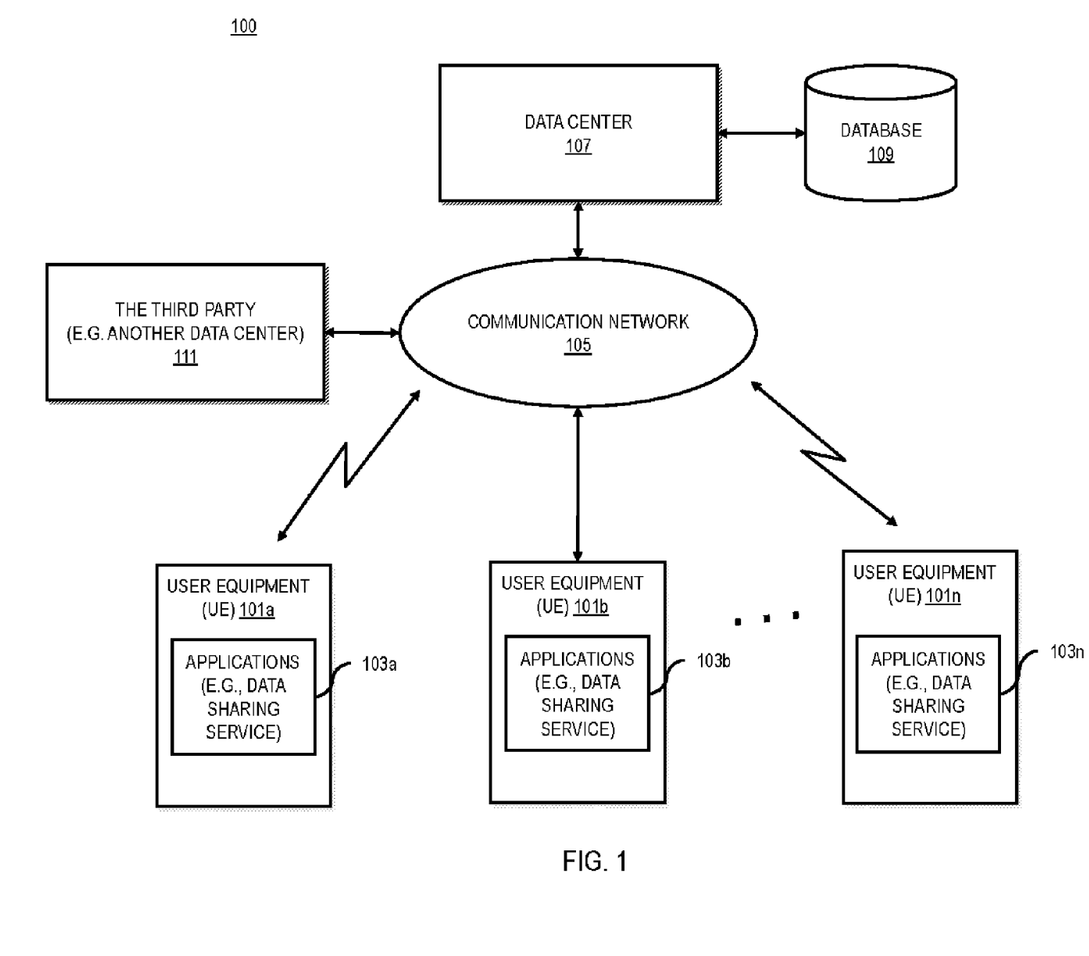
FIG. 1 is a diagram of a system capable of providing access control to shared data according to an embodiment.

FIG. 1 is a diagram of a system capable of providing access control to shared data according to an embodiment. As shown in FIG. 1, the system 100 comprises user equipment (UE) 101 having connectivity to a data center 107, other UEs 101 and other communication entities (such as a third party 111) via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), a self-organized mobile network, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), wireless local area network (WLAN), Long Term Evolution (LTE) networks, code division multiple access (CDMA), wideband code division multiple access (WCDMA), wireless fidelity (WiFi), satellite, mobile ad-hoc network (MANET), and the like.

The UE 101 can be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). As shown in FIG. 1, user equipment (UEs) 101a-101n may be utilized to perform social networking applications 103a-103n. These social networking applications 103 can utilize a communication network 105 to communicate to the data center 107, for example a data sharing service to control access to shared data.

The data center 107 can store user information and other data in a database 109 for sharing. The user information may include user profiles. Further, the user information may additionally include one or more settings of the user regarding access control to the shared data (e.g., valid time period of access and a blacklist of ineligible users). The shared data may include various data of a user, such as health records, exam results, work schedule, communication history, contacts etc. The data can be of any type, such as file, media content (e.g., images, video, audio, etc.), etc. In an exemplary embodiment, the data center 107 can be offered or operated by a cloud computing provider, for example, for providing data storage in cloud side.

As previously noted, the data sharing service 103 may be utilized by the UE 101 to provide access control to shared data. The UE 101 can utilize other social networking services (e.g., a messaging communication, telephone communications, social network games, etc.) to communicate with other UEs, the data center 107 and other communication entities (such as another data center 111, or the others not shown) in the system 100. In an example scenario, the UE 101a can transmit a user's health records to the data center 107 for storing the health records in the data center 107, so that the health records can be shared among a number of other users, such as his families and doctors in charge of his case. For ensuring the access of his health data by a number of trustworthy users, the health records can be encrypted according to an ABE scheme by taking a threshold of trust level as an attribute of an access condition. Decryption keys are issued only to users having a sufficient trust level, e.g. a trust level greater than or equal to the threshold of trust level. As such, the security of the access to the shared data can be ensured by the attributed-based encryption theory.

In an exemplary embodiment, a trust level can be evaluated based on clues accumulated from social networking activities or interactions among UE 101a and other UE 101, e.g. UE 101b, . . . , UE 101n. By way of example, UE 101a (such as a mobile phone) can automatically evaluate a trust level of a user of UE 101b by making use of records of mobile social networking and communications recorded by the UE 101a. The types of social networking and communication activities can be classified for facilitating the evaluation of a trust level. For example, they can be classified as the following five kinds: mobile voice calls, voice calls via mobile Internet (e.g., VoIP), short messages, instant messages and pervasive interaction with a person based on local connectivity. Generally, the number of voice calls (called and received) and the number of messages (sent and received) can reflect the social closeness between two users and their personal trustworthiness.

In an exemplary embodiment, a trust level evaluation function (1) shown as follows can be utilized to compute a trust level of two users based on mobile social networking activities among them.

$$TL(i,j) = f\{TL'(i,j) + pl(i,j) * \{w1 * \theta(N\_c(i,j) + N\_c(j,i)) + w2 * \theta(N\_m(i,j) + N\_m(j,i)) + w3 * \theta(N\_i(i,j) + N\_i(j,i))\} - pu(i,j)\} \quad (1)$$

In the function (1), symbol TL(i,j) represents the trust level of user j evaluated by user i, while symbol TL'(i,j) represents the trust level of user j evaluated previously by user i, or a default trust level. ƒ(x) represents a Sigmoid function, e.g.

$$f(x) = \frac{1}{1 + e^{-x}},$$

which is used to normalize a value into (0, 1). However, it is contemplated that the trust level needs not be normalized or can be normalized to any range.

Parameter N_c(i,j) represents the number of calls made by user i to user j, and accordingly N_c(j,i) represents the number of calls made by user j to user i. N_m(i,j) represents the number of messages sent by user i to user j, and accordingly N_m(j,i) represents the number of messages sent by user j to user i. Parameter N_i(i,j) represents the number of interactions initiated by user i to user j, and accordingly N_i(j,i) represents the number of interactions initiated by user j to user i. θ(I) represents a Rayleigh cumulative distribution function, e.g.

$$\theta(I) = \left\{1 - \exp\left(\frac{-I^2}{2\sigma^2}\right)\right\},$$

to model the impact of integer number I, where σ>0, is a parameter that inversely controls how fast the number I impact the increase of θ(I). Parameter σ can be set from 0 to theoretically ∞, to capture the characteristics of different scenarios of trust level assessment.

Parameters w1, w2, w3 represent weight parameters of voice call, messaging and instant interaction, respectively, to show the importance thereof. The sum of w1, w2 and w3 is equal to 1. Parameter pl(i,j) represents a priority level of user j in user i's social networks, e.g., a family member or close friend may have the highest priority level in various contexts of trust level assessment. Parameter pu(i,j) represents a punishment factor of user j in user i's view, e.g., due to bad social interaction/communication experiences.

It should be noted that the above trust level assessment function (1) is shown as one example for evaluating trust levels of users. There are various solutions of generating a trust value/level of each mobile social networking participant. In one embodiment, the trust levels can be evaluated automatically by the equipment of the user based on mobile social networking activities. However, it is contemplated that the trust levels can be entered by the user, or queried from other device (not shown), e.g., a server for evaluating and maintaining trust levels of multiple users in a centralized manner.

In an exemplary embodiment, the trust level can be linked to a context, for example based on a keyword extraction from messaging texts and voice/speech recognition. That is, the $N\_c(i,j)$, $N\_m(i,j)$ and $N\_i(i,j)$ can be recorded based on different context categories, thus $TL(i,j)$ can be generated targeting at the trust level fell into different contexts. For example, calls, messages and interactions between two users regarding health, treatments and hospitals can be recorded as a category, and used in assessing a trust level to be used to control access to health records in a data center. In another example, calls, messages and interactions between two users regarding education and school can be recorded as a category, and used in evaluating a trust level to be used to control access to exam results in a data center. Different contexts can be considered with regard to the same shared data. For example, for hospital records, the access control can be performed in different ways at different locations.

Based on the trust assessment in different context, the data owner can set data access control automatically based on trust levels, contexts and other limitations, such as a time period, a group of eligible user identities, etc. In a certain example, UE 101a can set an access policy, for his health records like that, if the access request comes from the hospital during a specified time period, an eligible user's trust level should be greater than 0.6, while if the access request does not comes from the hospital during another specified time period, an eligible user's trust should be greater than 0.8. It is contemplated that the access policy can be set in any ways, to satisfy various necessities of data access control.

Based on the access policy, UE 101a can encrypt the data to be shared according to an ABE scheme, by taking a trust level as an attribute of an access policy. In an exemplary embodiment, UEs 101a-101n, can obtain a public master key (denoted as PK) and a secret master key (denoted as MK) during a setup process of a security system (e.g. the data sharing service 103a-103n), as commonly proceeded in encryption schemes. For example, PK and MK can be generated through a setup algorithm which takes the implicit security parameter $1^k$ as an input. This setup process can be conducted at the user's equipment (e.g. UEs 101a-101n), or a trustworthy user agent (not shown) in response to the user's request. PK is a global key that is available to every user (e.g. UEs 101a-101n in this example) in the system, and it can be used as input for all operations. MK is a master key that is applied to create the user's own keys.

With the public key PK, the master key MK of a user and an identity of the user u which is generally an unique user identity (e.g. the user's telephone number, universal resource identifier, etc.), the public key of user (for example, the public key of user for user u can be denoted as PK_u) and the secret key of user (for example, the secret key of user for user u can be denoted as SK_u) can be generated for the user. Every user can maintain PK_u and SK_u. PK_u can be used to generate personalized secret attribute keys, and SK_u can be used in the decryption operation related to PK_u. In the example embodiments, the public key PK_u' of user u' (e.g. a user of UE 101b or 101n) can be used by a data owner (e.g. user u of UE 101a) to generate a secret attribute key personalized for user u', and thus the secret key SK_u' of user u' can be used for the decryption of ciphertexts together with the secret attribute key personalized for user u'. The secret key of a user can be used by the data owner (e.g. a user u of UE 101a) to generate personalized secret attribute keys to be issued to eligible users (e.g. users of UE 101b or 101n). The generation and distribution of PK_u and SK_u can be performed by the user's equipment (e.g. UEs 101a-101n) or a trustworthy user agent (not shown) in response to the user's request. Before these two keys are generated and issued, for example during user registration into the system, the unique identity of the users can be verified, so that the keys SK_u and PK_u of a user u are bound to a unique identity of the user. This binding can facilitate the verification of the user's attributes. In an example, a unique identity of a user u can be taken as PK_u, or PK_u can be a part of the unique identity of the user u.

In an exemplary embodiment, the personalized secret attribute keys can be issued to respective eligible users based on trust levels of the respective users. Furthermore, a trust level can also be used as an attribute to generate a public attribute key, for representing an access condition for the data based on the trust level (e.g. a threshold of trust level). According to an ABE scheme, each attribute is associated with an access condition, and an access policy is a set of access conditions, for example required for different access contexts. An access policy can be described in a Disjunctive Normal Form (DNF). For example, an access policy (denoted as AA) in DNF can be written as:

$$AA = \bigvee_{j=1}^{n} \left( \bigwedge_{A \in S_j} A \right) \quad (2)$$

where $S_j$ denotes the j-th access condition in an access policy, and n is the total number of S (n=1, 2, 3, . . . ). A denotes an attribute that occur in the j-th conjunction of AA. S can be a set of attributes, and S1, S2, . . . , Sn, are not pairwise disjoint.

For example, a threshold of trust level 0.8 can be set as an attribute to indicate an access condition: t1>=0.8, which means that only those users with a trust level over or equal to 0.8 can access the shared data. An access condition S1 can comprise only one attribute (the trust level). In another example, the access condition S1 can further comprise another attribute regarding valid time period, to indicate the access condition S1 further comprises, e.g. t∈[20120101, 20121231], which limits access to the shared data to the year 2012. As such, the access condition S1 refers to that the shared data can be accessed by those users with a trust level greater or equal to 0.8 in the year 2012. It should be appreciated that an access condition can comprise other kinds of attributes, except or besides a trust level and/or a time period. An access policy can comprise one or more access conditions. For example, an access policy can comprise another access condition S2. S2 can comprise two attributes of a trust level and a valid time period: 0.6=<t1<0.8, and t∈[20120901, 20120930], which indicates the shared data can only be accessed by those users with a trust level greater than or equal to 0.6 and lower than 0.8 between 1 Sep. 2012 and 30 Sep. 2012.

In order to control access to shared data according to an access policy, public attribute keys associated respective attributes can be used to encrypt the data. In the exemplary embodiment, a public attribute key (denoted as PK_TL) of the attribute regarding a trust level (also called a trust level related attribute, and denoted as TL) can be generated, for example when a data owner (e.g. the user u of UE 101*a*) would like to control the access to his/her data based on trust assessment. The generation can be executed by the device of the user u, e.g. UE 101*a*. UE 101*a* can check the access policy for the shared data. When there is a trust level related attribute, a public attribute key PK_TL can be generated based on TL and additional parameters, for example SK_u and PK. When there is no such an attribute, there is no public attribute key of the attribute TL. For example, the public attribute key PK_TL is NULL.

Optionally, a public attribute key (denoted as PK_T) of an attribute regarding a valid time period (also called time related attribute, and denoted as T) can be further generated, for example when a data owner (e.g. the user u of UE 101*a*) would like to control the access to his/her data based on time. The generation can be executed by the device of the user u, e.g. UE 101*a*. UE 101*a* can check the access policy for the shared data. When there is such a time related attribute, a public attribute key PK_T can be generated based on T and additional parameters, for example SK_u and PK. When there is no such an attribute, there is no public attribute key of the attribute T. For example, the public attribute key PK_T is NULL.

The shared data (denoted as M) can be encrypted by using the public attribute keys associated with attributes of an access condition indicated by the access policy, as well as other parameters, such as the public key. In an example, an encryption algorithm can take as input the public key PK, personal data M, an access policy AA and the public keys PK_TL, PK_T respectively associated with the trust level and time occurring in the access condition indicated by the policy AA, and then output the encrypted data, a ciphertext CT. This encryption is conducted at a user device (e.g. UE 101*a*) to protect the user's personal data. The encrypted data are uploaded to a data center (e.g. 107) for storage in a database (e.g. 109). It should be noted that either PK_TL, or PK_T or both can be used in the encryption of the shared data, which depends on the access policy defined in AA. For example, when the user would like to control access his/her data only based on the trust level, the encrypt algorithm can take only PK, M, A, PK_TL as inputs. When the data access is controlled by both the trust level and the time, the encrypt algorithm can take only PK, M, A, PK_TL, PK_T as inputs.

The encrypted data stored in the data center can be access by eligible users (i.e. those meeting an access condition) with secret attribute keys personalized for respective users. Each of the secret attribute keys corresponds to respective public attribute keys. To prevent collusion, every user gets a different secret attribute key that only he can use. For example, a secret attribute key of a trust level related attribute TL, issued for an eligible user u' by user u is denoted as SK_(TL,u,u'). A secret attribute key of a time relate attribute T, issued for an eligible user u' by user u is denoted as SK_(T,u,u'). As such, a set of secret keys that a user u' has (i.e., the key SK_u' and all keys SK_(TL,u,u') and SK_(T,u,u')) can be called as his key ring.

The data owner (e.g. a user u of UE 101*a*) can check whether the trust level of another user u' with a public key PK_u' (and/or a unique ID u') can satisfy the access condition with regard to the trust level related attribute TL (e.g., whether the trust level of u' is equal or above a threshold of trust level). When the trust level of user u' satisfies the access condition, UE 101*a* can issue a secret attribute key corresponding to the attribute TL. The secret attribute key SK_(TL,u,u') personalized for an eligible user u' can be generated by the UE 101*a* with the attribute TL, an unique identity of the user u', and other parameters (such as PK, SK_u, PK_u', etc.), according the ABE scheme. In an exemplary embodiment, SK_(TL,u,u') can be generated by the UE 101*a* in response to a request from the user u' (e.g. from UE 101*b*). Optionally, the user u of UE 101*a* can check whether another user u' with a public key PK_u' (and/or a unique ID u') is eligible with regard to the time related attribute T (e.g. whether the shared data can be accessed in an indicated time period by u'). When user u' is eligiable, UE 101 can issue a secret attribute key corresponding to the attribute T. The secret attribute key SK_(T,u,u') personalized for an eligible user u' can be generated by the user device of the user u with the attribute T, a unique identity of the user u', and other parameters (such as PK, SK_u, PK_u', etc.), according the ABE scheme. In an exemplary embodiment, SK_(T,u,u') can be generated by the UE 101*a* in response to a request from the user u' (e.g. from UE 101*b*).

The secret attribute keys (e.g. SK_(TL,u,u') and SK_(T,u,u')) personalized for an eligible user u' can be issued to the user u' when the attributes of user u' satisfy the access condition. With these secret attribute keys, the device (e.g. UE 101*b*) of user u' can decrypt the encrypted data of the user u obtained from the data center 107. For example, according to a corresponding ABE scheme, a decryption algorithm can take as input a ciphertext CT produced by the corresponding encryption algorithm, a key ring SK_u', SK_(TL,u,u') and SK_(T,u,u') for user u', and the access policy AA under which CT was encrypted, and then output the corresponding plaintext M, when the attributes of user u' were sufficient to satisfy the access condition indicated by the access policy AA. When the attributes were not sufficient to satisfy the access condition, the encrypted data cannot be decrypted. For example, the output of the decryption algorithm is NULL. This decryption can be executed when an eligible user u' would like to access the shared data of another user u that are saved at a data center. The user u' can firstly checks the access policy AA of the encryption to determine the applied access condition, then conducts corresponding decryption with the key rings associated with the applied access condition.

It should be noted that either SK_(TL,u,u'), or SK_(T,u,u') or both can appear in the decryption algorithm, which depends on the access policy defined in AA. Concretely, if the user would like to control access his/her data only based on the trust level, the decryption algorithm can take PK, CT, A, SK_u', SK_(TL,u,u') as inputs. If the user would like to control access his/her data only based on the time, the decryption algorithm can take PK, CT, A, SK_u', SK_(T,u,u') as inputs. If the data access is controlled by both the trust level and the time period, the decrypt algorithm can take PK, CT, A, SK_u', SK_(TL,u,u'), SK_(T,u,u') as inputs.

Figure 2:
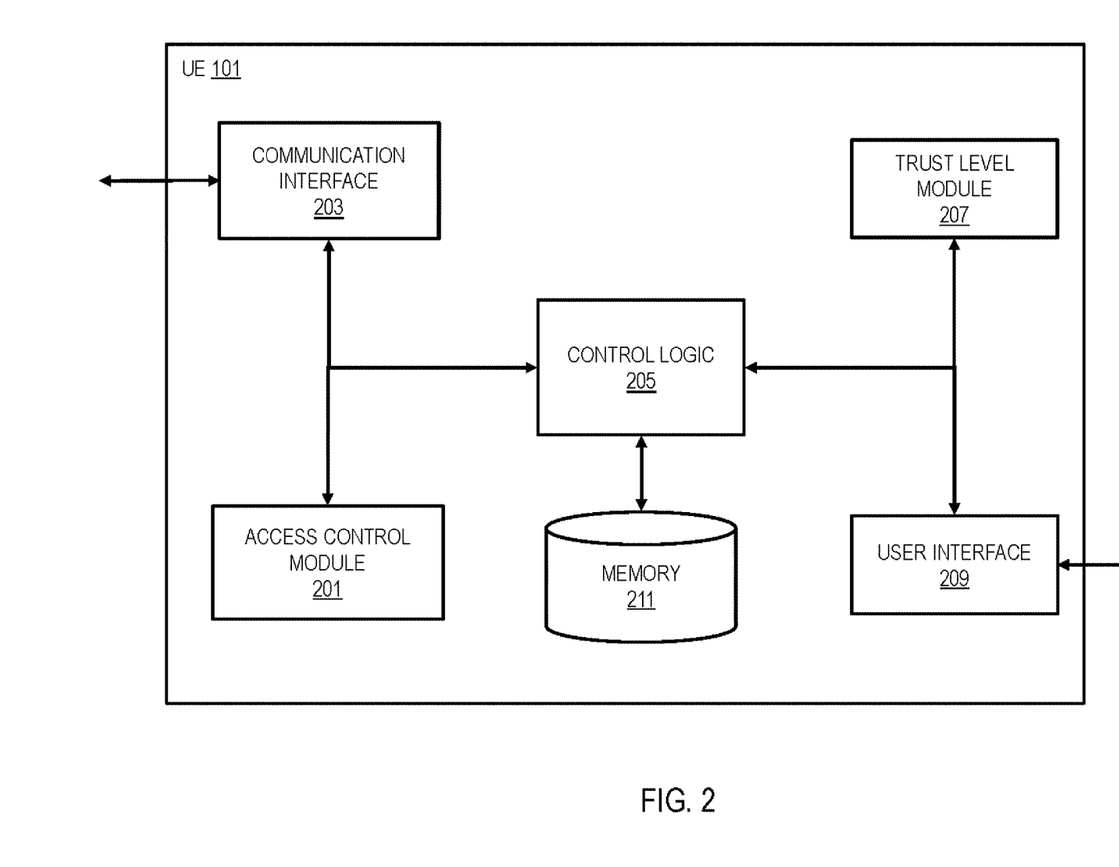
FIG. 2 is a diagram of the components of user equipment capable of providing access control to shared data, according to one embodiment

FIG. 2 is a diagram of the components of user equipment capable of providing access control to shared data according to one embodiment. It is contemplated that the functions of these components may be combined in one or more components or performed by other components of equivalent functionality. In this embodiment, the UE 101 includes a access control module 201 to control access to shared data stored in a data center 107, a communication interface 203 to communicate over a network, control logic 205 to control the runtime of applications executing on the UE 101, a trust level module 207, a user interface 209 to output information and receive input, and a memory 211.

The control logic 205 can run applications (e.g., data sharing services) on the UE 101. The information and data of these data sharing services can be stored in the memory 211 while executing. These services may utilize the user interface 209 to interact with users, and a communication interface 203 to interact with other UEs 101, the data center 107 and other communication entities (e.g., via a communication network 105). The access control module 201 may be used by the control logic 205 to control access to the user's shared data stored in the data center 107, for example by encrypting the data, uploading the encrypted data into the data center, checking eligibilities of other users, and issuing personalized secret attribute keys only to eligible users. Further, the access control module 201 may be utilized to access data of other users from data center 107 and obtain personalized secret attribute keys from the other users.

The communication interface 203 may include multiple means of communication. For example, the communication interface 203 may be able to communicate over SMS, internet protocol, instant messaging, voice sessions (e.g., via a phone network), or other types of communication. The communication interface 203 can be used by the control logic 205 to communicate with other UEs 101, the data center 107, and other devices (e.g. 111). In some examples, the communication interface 203 is used to transmit and receive information using protocols and methods associated with the access control module 201.

In one embodiment, a UE 101 includes a user interface 209. The user interface 209 can include various methods of communication. For example, the user interface 209 can have outputs including a visual component (e.g., a screen), an audio component, a physical component (e.g., vibrations), and other methods of communication. User inputs can include a touch-screen interface, a scroll-and-click interface, a button interface, etc. In certain embodiments, the user interface 209 may additionally have a vocal user interface component. As such, a text-to-speech mechanism may be utilized to provide textual information to the user. Further, a speech-to-text mechanism may be utilized to receive vocal input and convert the vocal input into textual input. Moreover, the user interface 209 may be utilized to present information and content associated with the data access control module 201, and receive inputs of a user associated with the access control module 201.

In an embodiment, UE 101 can utilize a trust level module 207 to obtain trust levels among users. As noted above, the trust level module 207 may be utilized to query trust levels from a trust level assessment server, or to assess trust levels by itself automatically based on mobile social networking activities among users. The assessed trust levels may be stored in memory 211 and used by the access control module 201.

Figure 3:
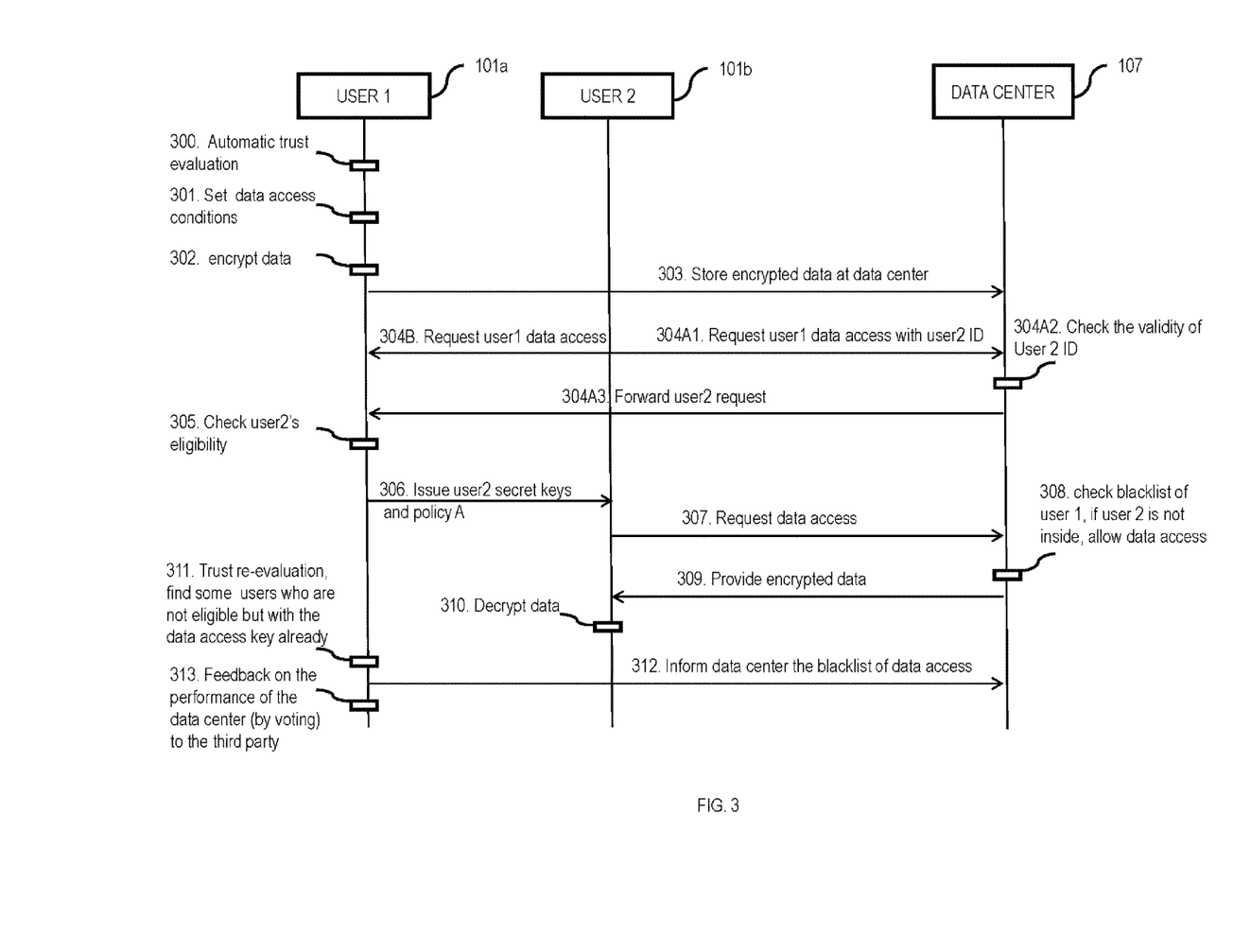
FIG. 3 is a flowchart of an overall system process for providing access control to shared data according to an embodiment.

FIG. 3 is a flowchart of an overall system process for providing access control to shared data according to an embodiment. In an exemplary embodiment, a user (denoted as user 1) would like to save his sensitive personal data at a CSP data center through his user equipment (e.g. UE 101a), while other users (commonly denoted as user 2) would like to access through their respective user equipment (e.g. UE 101b, . . . , 101n) the data with the authorization of user 1.

In an exemplary embodiment, user 1 can conduct (step 300) an automatic trust assessment based on mobile social networking activities, behaviors and experiences, by his user equipment UE 101a. This trust assessment can be periodically executed or triggered by bad experiences. As noted previously, the trust assessment can be executed by other entities, such as a user agent, a centralized server which can assess trust levels for all users in a system and distribute trust assessment results. Based on the trust assessment results, user 1 can set (step 301) access conditions of his sensitive data (such as a threshold of trust level and valid access time period), which constitute an access policy. In another embodiment, the access conditions can be set as default access conditions.

Then, user 1 can encrypts his data based on the access conditions in step 302 as discussed above according to an ABE scheme, and stores the encrypted data at the CSP data center in step 303 for sharing with other users. As such, the corresponding load for storing and maintaining the data of user equipment can be reduced. Meanwhile, the shared data can be stored at the CSP data center in a secure way, and the privacy of the shared data can be enhances by hiding the plaintext from the CSP. There is no way for the CSP to know the plaintext of the shared data although they are stored at its data center. The valid access to the shared data is only allowed to eligible users, such as the users whom are trusted by the data owner and/or in a specified period.

In step 304, user 2 would like to access user 1's data. In an exemplary embodiment, user 2 can send a request to the CSP data center (step 304A1), and the CSP data center can check the validity of user 2. For example, the CSP data center can check whether the identity ID of user 2 is in a blacklist, in order to determine whether to forward user 2's request to user 1. In this regard, when the ID of user 2 is not in the blacklist, the user 2's request can be forwarded to user 1. The blacklist can indicate ineligible users for access the shared data. The ineligible users in the blacklist can be determined by the CSP, user 1 or other users, or a third party, e.g. according to trust assessment. As such, requests from those ineligible users can be blocked by the CSP in advance, without disturbing user 1. In another exemplary embodiment, user 2 can also request user 1 directly about the data access.

Next, user 1 can check (step 305) the eligibility of user 2 based on a trust level, to determine whether the user 2's trust level can satisfy one access condition. For example, user 1 can check whether the trust level of user 2 is greater than or equal to a threshold of trust level 0.8. In an exemplary embodiment, user 1 can further check the eligibility of user 2 based on a valid time period, to determine whether user 2 is permitted to access the shared data during the valid time period. For example, user 1 can further check whether the time when receiving the request from user 2 with a trust level over 0.8 is within the year 2012.

Then, based at least in part on the check, for example when user 2 is eligible, user 1 can generate and issue (step 306) personalized secret attribute keys for user 2 to access data stored at the CSP data center. The generation of the personalized secret attribute keys can be performed based on the attributes associated with the access condition satisfied by user 2, according to an ABE scheme, as discussed above with reference to FIG. 1. In an exemplary embodiment, user 1 can further provide to user 2 the access policy AA at the same time, so that multiple context-based attributes (e.g. multiple TLs in a set of access conditions for multiple contexts) can also be supported.

In step 307, after obtaining the issued personalized secret attribute keys, user 2 can request the CSP data center to access the encrypted data. In an exemplary embodiment, before initiating the access, the CSP can check (step 309) the access policy of the encrypted data defined by user 1 to see if user 2 can satisfy one access condition of the access policy. For example, the CSP can check and see whether the valid time period has been expired. As such, the CSP can block data access after the access time period is expired. In an exemplary embodiment, the CSP can further remind the data owner user 1 to upload newly encrypted data. In an exemplary embodiment, the CSP can check the blacklist of user 1 to see if user 2 is inside.

In step 309, when user 2 satisfies one access condition indicated by the access policy, the CSP allows the access by providing the corresponding encrypted data to user 2. Then, user 2 can decrypt the encrypted data in step 310.

Due to the dynamic change of trust level, a previous eligible user (user 2) may become distrusted, after he got from user 1 the secret attribute keys personalized for user 2. Thus, the data owner user 1 won't allow user 2 to access the shared data any more although user 1 has already issued to user 2 the secret attribute keys and the valid access period has not been expired. In this case, the data owner user 1 can inform the CSP the blacklist of the users who is not eligible to access the data in the valid access period. Thus, those users whose current trust level is below a threshold (i.e., unsatisfied with the access condition) cannot access the data any more through the control of the CSP.

In an exemplary embodiment, the trust level of user 2 can be re-evaluated (step 311), for example by user 1 based on the latest mobile social networking activities. When there are some users who have been issued the secret attribute keys are not eligible any more, user 1 can inform this to the CSP data center. For example, user 1 can put identities of those ineligible users into his data access blacklist and inform the CSP the blacklist, in step 312.

In an exemplary embodiment, user 1 can further feedback (step 313) on the performance of the data center or the CSP (e.g. by voting) to a third party, so as to guard against a semi-trusted data center. Each CSP's reputation can be evaluated according to the user's feedback and published in order to encourage and ensure the good behavior of CSPs. For the CSP who is not reputable, the user can select not to use the CSP's services (i.e., not saving personal data at the data center of the CSP, thus CSP will lose its business customers).

There are many existing reputation mechanisms can be applied to evaluate a reputation of a data center or a CSP based on user's feedback. Suppose the user k's voting on a CSP at time t is V(k,t), and the user's own credibility of providing feedback at time t is C(k,t), we can have the reputation value R of a CSP as:

$$R(t_e) = \frac{\theta(K)}{O} \sum_{k=1}^{K} V(k,t) * C(k,t) * e^{\frac{|t_e-t|^2}{\tau}}, \quad (3)$$

where $$O = \sum_{m} C(k,t) * e^{\frac{|t_e-t|^2}{\tau}};$$

K is the total number of votes on the CSP; $t_e$ is the reputation evaluation time at which the reputation of the CSP is evaluated; t is the time of vote V(k,t); parameter $\tau$ is used to control a time decaying so that more attention can be paid to the current votes, in order to overcome some potential attacks, such as collaborative bad mouthing attack. $\theta(\ )$ has the same meaning as in function (1). C(k,t) can be generated based on the performance of user's feedback by considering all the feedbacks provided by all users with the CSP service experiences. It should be note that the reputation generation service could be offered by a third party, e.g., another cloud computing service, or an authorized trusted party. Based on such a reputation system, a CSP can be ensured to perform the above access control to the shared data following the data owner's instruction and expectation.

Figure 4:
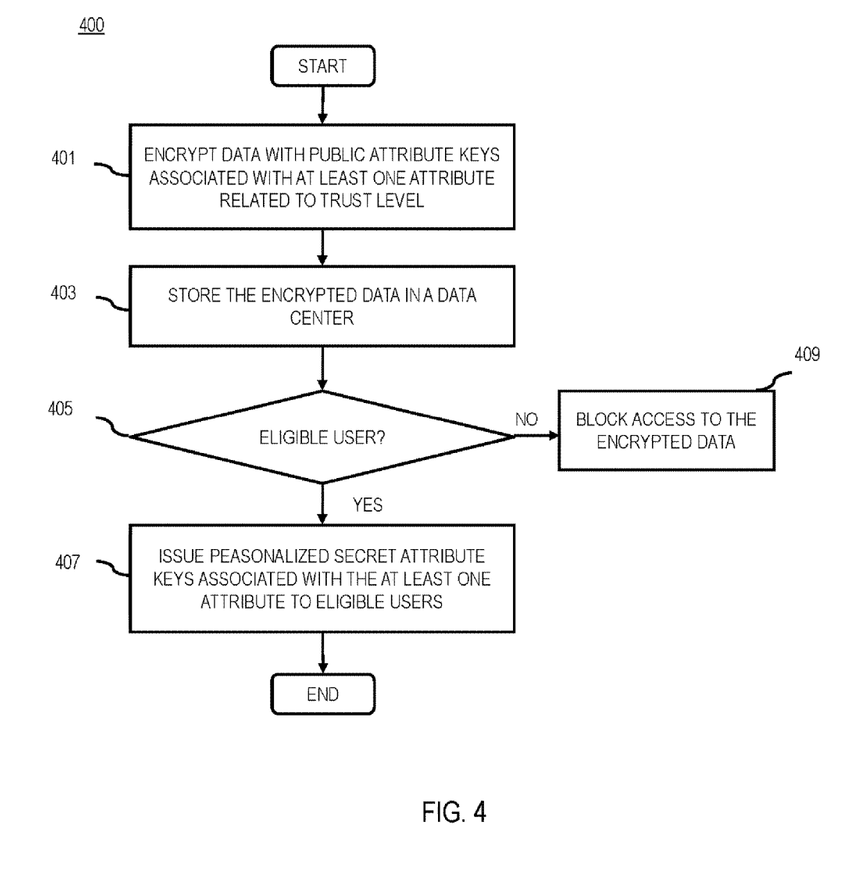
FIG. 4 is a flowchart of a process for providing access control to shared data based on a trust level, according to one embodiment.
Figure 5:
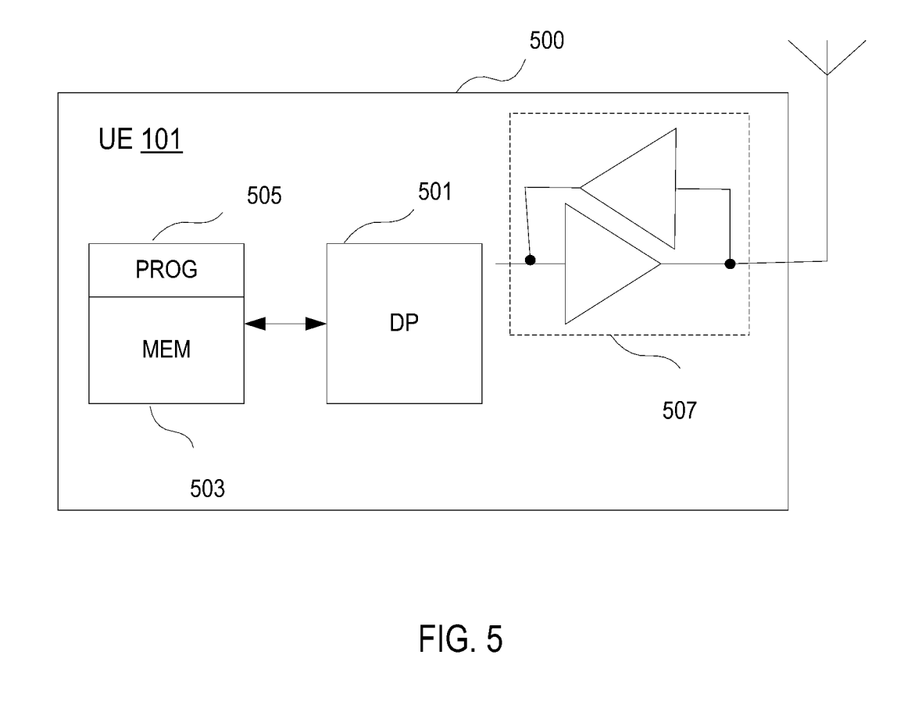
FIG. 5 is a simplified block diagram of various devices that are suitable for use in practicing the exemplary embodiments of the present invention.

FIG. 4 is a flowchart of a process for providing access control to shared data based on a trust level, according to one embodiment. In such an embodiment, the access control module 201 of one or more UEs 101 (e.g., a UE 101a associated with sharing user, a UE 101b, 101n associating with a requesting user) performs the process 400 and is implemented in, for instance, a chip set including a processor and a memory as shown in FIG. 5. As such, the access control module 201 can provide means for accomplishing various parts of the process 400 as well as means for accomplishing other processes in conjunction with other components. In one embodiment, a trust level module 207 can be used to evaluate trust levels based on mobile social networking activities.

In step 401, UE 101a can encrypt data with public attribute keys (such as PK_TL, PK_T) associated with attributes according to an ABE scheme. The attributes can comprises at least one trust level related attribute (such as TL) representing an access condition for the data based on a trust level. In one embodiment, the access condition for the data can be set by UE 101a.

Next in step 403, the encrypted data is stored into a data center, such as the data center 107.

In step 405, UE 101a can determine the eligibility of other users of a second device (such as UE 101b, . . . , UE 101n) by checking whether a trust level of the other users can satisfy the access condition. In one embodiment, the determination is performed in response to receive a request of the user of the second device directly from the second device or via the data center, to access the data. In one embodiment, UE 101a can automatically evaluate the trust level of the other user based on the mobile social networking activities between a user of UE 101a and the other users. Alternatively or additionally, the trust levels of the other users can be obtained from other devices.

In one embodiment, the trust level related attribute TL indicates a pre-determined threshold of trust level, and then the checking can comprise checking whether the trust level of the second user meet the pre-determined threshold of trust level. In one embodiment, the attributes can further comprise at least one time related attribute representing the access condition for the data based on a valid time period. Then the determination of the eligibility of the other user can further comprise checking whether the user is eligible within the valid time period, and the secret attribute key associated with the at least one time related attribute is generated based on an identity of the user and the at least one time related attribute.

Next in step 407, when the user of the second device (such as UE 101b) is eligible, UE 101a can issue to UE 101b, secret attribute keys (such as SK_(TL,u,u'), SK_(T,u,u')) associated with attributes and personalized for the user of the second device for decrypting the encrypted data. In one embodiment, the secret attribute key associated with the at least one trust level attribute can be generated based on an identity of the user u and the at least one trust level related attribute TL. When the user of the second device (such as UE 101*b*) is ineligible, his access to the encrypted data in the data center will be blocked (step 409).

In one embodiment, UE 101*a* can inform an access policy of the data to the second device, wherein the access policy indicates a corresponding access condition used for a particular access context. Then, the secret attribute keys can be generated based on the identity of the user and the at least one trust level related attribute TL representing the corresponding access condition indicated by the access policy.

As such, a trust level assessed in mobile social networking can be used to control personal data access at a data center (e.g., offered by a semi-trusted cloud computing service provider). In a concrete embodiment, a trust level with regard to a concrete context (e.g., health treatment) can be assessed based on social networking activities, behaviors and experiences. According to the trust level and its linked concrete context, the personal data of health records stored in a data center of a CSP can be encrypted by the data owner. The data owner issues the decryption keys to those eligible users to access his/her personal data. Thus, shared data access (e.g. with an access conditions like that, a trust level of the user requesting to access>a threshold in a context cxt 1 and a time within a concrete period) can be fully controlled by the data owner.

Through various embodiments, the processing cost or computational cost in the user equipment of the data owner is reduced. In this regard, the encryption for the shared data is only conducted once using the attribute-based encryption. In contrast, many existing solutions apply both attribute-based encryption and proxy-re-encryption (e.g. performed at a CSP or an agent). Herein, CSP can be ensured to perform as the data owner expected by applying a reputation system to evaluate each CSP's performance in order to help the users select the best CSP for personal data storage and process. Moreover, the trust level can be evaluated automatically based on mobile social networking activities (such as mobile social networking records in the user equipment), thus greatly reduce the cost for collecting evidences for trust assessment.

Furthermore, in various embodiments, the revocation of user can be handled by applying time as one attribute in the attribute-based encryption. As such, the issued secret key can be automatically expired when the time related condition is not satisfied. Meanwhile, a blacklist issued by the data owner can be used to conduct additional access control at a CSP even though some distrusted users still hold valid secret attribute keys. This is achieved with the support of a reputation system. Therefore, the system complexity caused by key re-generation and management can be reduced. At the same time, transmission load can be also reduced by various embodiments, because there is no need to transmit new keys to new eligible users when some old eligible users are revoked.

Now reference is made to FIG. 5 illustrating a simplified block diagram of various electronic devices that are suitable for use in practicing the exemplary embodiments of the present invention. In FIG. 5, user equipment 500 (such as UE 101*a* and UE 101*b*) is adapted for communication with user equipment, a data center, and other communication devices. An access control to shared data saved in a data center (e.g. the data center 107) can be executed according to the exemplary embodiments of the present invention as discussed above.

The user equipment 500 includes a data processor (DP) 501, a memory (MEM) 503 that stores a program (PROG) 505, and a suitable transceiver 507 for communications with other user equipments, a data center, and other communication devices via one or more communication networks. In an exemplary embodiment, the transceiver 507 can be a suitable radio frequency (RF) transceiver for bidirectional wireless communications via one or more antennas. The PROG 505 is assumed to include program instructions that, when executed by the DP 501, enable the user equipment to operate in accordance with the exemplary embodiments of this invention, as discussed above. That is, the exemplary embodiments of this invention may be implemented at least in part by computer software executable by the DP 501, or by hardware, or by a combination of software and hardware. The basic structure and operation of the user equipment 500 are known to one skilled in the art.

The MEM 503 may be of any type suitable to the local technical environment and may be implemented using any suitable data storage technology, such as semiconductor based memory devices, flash memory, magnetic memory devices and systems, optical memory devices and systems, fixed memory and removable memory. The DP 501 may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

It should be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skills in the art, the function of the program modules may be combined or distributed as desired in various embodiments. In addition, the function may be embodied in whole or in part in firmware or hardware equivalents such as integrated circuits, field programmable gate arrays (FPGA), and the like.

The present invention includes any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

What is claimed is:

1. A method, comprising:
   encrypting, at a first device associated with a first user, data by at least using public attribute keys associated with attributes, wherein the encrypting is performed in accordance with an attribute-based encryption scheme, and wherein the attributes comprising at least one trust level related attribute representing an access condition for the data based on a trust level;
   storing the encrypted data into a data center;
   determining an eligibility of a second user of a second device by at least:
      identifying an interaction between the first user of the first device and the second user of the second device, the interaction having a same context as the encrypted data, wherein the identifying is based at least on one or more keywords present in the interaction; and
      generating a value corresponding to a trust level of the second user of the second device, wherein the generating is based at least on a frequency of the interaction between the first user of the first device and the second user of the second device; and
   issuing, to the second device, secret attribute keys associated with attributes and personalized for the second user of the second device for decrypting the encrypted data, wherein the secret attribute keys are issued based at least on a determination that the second user of the second device is eligible.

2. The method of claim 1, wherein the generating is automatic, and wherein the interaction comprises mobile social networking and/or communication activities between the first user of the first device and the second user of the second device.

3. The method of claim 2, further comprising:
   re-evaluating, subsequent to the issuing of the secret attribute keys, the trust level of the second user of the second device, wherein the re-evaluating includes generating another value corresponding to the trust level of the second user of the second device;
   re-determining the eligibility of the second user of the second device based at least in part on the other value corresponding to the trust level of the second user of the second device; and
   informing the data center that the second user of the second device is ineligible, when the second user of the second device is determined to be ineligible.

4. The method of claim 2, wherein the generating is further based at least in part on one or more weights associated with different types of mobile social network and/or communication activities.

5. The method of claim 2, wherein the social network and/or communication activities include messaging communication, telephone communication, and social network games conducted between the first user of the first device and the second user of the second device.

6. The method of claim 1, further comprising:
   providing, to the second device, an access policy of the data stored at the data center, wherein the access policy indicates a corresponding access condition that is associated with the context, and wherein the secret attribute keys are generated based on the identity of the second user of the second device and the at least one trust level related attribute representing the corresponding access condition indicated by the access policy.

7. The method of claim 1, further comprising:
   receiving, at the first device, a request to access the data stored at the data center, wherein the request is received directly from the second device or via the data center, and wherein the determining of eligibility is performed in response to the request.

8. The method of claim 1, further comprising:
   sending, to a third party, feedback regarding the performance of the data center, wherein the feedback is used by the third party to evaluate a reputation of the data center; and
   determining, based at least in part on the reputation of the data center, whether or not to continue storing the encrypted data in the data center.

9. The method of claim 1, wherein the secret attribute key associated with the at least one trust level attribute is generated based on an identity of the second user of the second device and the at least one trust level related attribute.

10. The method of claim 1, wherein the trust level related attribute indicates a pre-determined threshold of trust level, and the second user of the second device is eligible when the value corresponding to the trust level meets the pre-determined threshold of trust level.

11. The method of claim 1, wherein the attributes further comprises at least one time related attribute representing the access condition for the data based on a valid time period, and the determining further comprises checking whether the second user of the second device is eligible in the valid time period, and the secret attribute key associated with the at least one time related attribute is generated based on an identity of the second user of the second device and the at least one time related attribute.

12. The method of claim 1, further comprising:
   storing, at the first device, one or more records of interaction between the first user of the first device and the second user of the second device; and
   determining, based at least on the one or more records, the frequency of interaction between the first user of the first device and the second user of the second device.

13. An apparatus comprising:
   at least one processor; and
   at least one memory including computer program code,
   the at least one memory and the computer program code configured to, with the at least one processor, cause the apparatus to perform at least the following:
   encrypt, at the apparatus, data by at least using public attribute keys associated with attributes, wherein the apparatus is associated with a first user, wherein the encrypting is performed in accordance with an attribute-based encryption scheme, and wherein the attributes comprising at least one trust level related attribute representing an access condition for the data based on a trust level;
   store the encrypted data into a data center;

determine an eligibility of a second user of another apparatus by at least:
   identifying an interaction between the first user of the first device and the second user of the second device, the interaction having a same context as the encrypted data, wherein the identifying is based at least on one or more keywords present in the interaction; and
   generating a value corresponding to a trust level of the second user of the second device, wherein the generating is based at least on a frequency of the interaction between the first user of the first device and the second user of the second device; and
issue, to the other apparatus, secret attribute keys associated with attributes and personalized for the second user of the other apparatus for decrypting the encrypted data, wherein the secret attribute keys are issued based at least on a determination that the second user of the second device is eligible.

14. The apparatus of claim 13, wherein the generating is automatic, and wherein the interaction comprises mobile social networking and/or communication activities between the first user of the apparatus and the second user of the other apparatus.

15. The apparatus of claim 14, wherein the apparatus is further configured to at least:
   re-evaluate, subsequent to the issuing of the secret attribute keys, the trust level of the second user of the other apparatus, wherein the re-evaluating includes generating another value corresponding to the trust level of the second user of the other apparatus;
   re-determine the eligibility of the second user of the other apparatus based at least in part on the other value corresponding to the re-evaluated trust level of the second user of the other apparatus; and
   inform the data center that the second user of the other apparatus is ineligible, when the second user is determined to be ineligible.

16. The apparatus of claim 13, wherein the apparatus is further configured to set the access condition for the data.

17. The apparatus of claim 13, wherein the apparatus is further configured to at least:
   provide, to the other apparatus, an access policy of the data stored at the data center, wherein the access policy indicates a corresponding access condition that is associated with the context, and wherein the secret attribute keys are generated based on the identity of the second user of the second device and the at least one trust level related attribute representing the corresponding access condition indicated by the access policy.

18. The apparatus of claim 13, wherein the apparatus is further configured to at least:
   receive, at the apparatus, a request to access the data stored at the data center, wherein the request is received directly from the other apparatus or via the data center, and wherein the determining of eligibility is performed in response to the request.

19. The apparatus of claim 13, wherein the apparatus is further configured to at least:
   send, to a third party, feedback regarding the performance of the data center, wherein the feedback is used by the third party to evaluate a reputation of the data center; and
   determine, based at least in part on the reputation of the data center, whether or not to continue storing the encrypted data in the data center.

20. The apparatus of claim 13, wherein the secret attribute key associated with the at least one trust level attribute is generated based on an identity of the second user of the other apparatus and the at least one trust level related attribute.

21. The apparatus of claim 13, wherein the trust level related attribute indicates a pre-determined threshold of trust level, and the second user of other apparatus is eligible when the value corresponding to the trust level meets the pre-determined threshold of trust level.

22. The apparatus of claim 13, wherein the attributes further comprises at least one time related attribute representing the access condition for the data based on a valid time period, and the determining further comprises checking whether the second user of the other apparatus is eligible in the valid time period, and the secret attribute key associated with the at least one time related attribute is generated based on an identity of the second user of the other apparatus and the at least one time related attribute.

23. A non-transitory computer-readable storage medium carrying one or more sequences of one or more instructions which, when executed by one or more processors, cause an apparatus to at least perform the following:
   encrypting, at a first device associated with a first user, data by at least using public attribute keys associated with attributes, wherein the encrypting is performed in accordance with an attribute-based encryption scheme, and wherein the attributes comprising at least one trust level related attribute representing an access condition for the data based on a trust level;
   storing the encrypted data into a data center;
   determining an eligibility of a second user of a second device by at least:
      identifying an interaction between the first user of the first device and the second user of the second device, the interaction having a same context as the encrypted data, wherein the identifying is based at least on one or more keywords present in the interaction; and
      generating a value corresponding to a trust level of the second user of the second device, wherein the generating is based at least on a frequency of the interaction between the first user of the first device and the second user of the second device; and
   issuing, to the second device, secret attribute keys associated with attributes and personalized for the second user of the second device for decrypting the encrypted data, wherein the secret attribute keys are issued based at least on a determination that the second user of the second device is eligible.

* * * * *